(12) United States Patent
Unema

(10) Patent No.: US 6,352,347 B1
(45) Date of Patent: Mar. 5, 2002

(54) VIEWING DIRECTION MODIFYING DEVICE AND METHOD

(76) Inventor: Norman P. Unema, 5725 Elm Ave., Hudsonville, MI (US) 49426

( * ) Notice: Subject to any disclaimer, the term of this patent is extended or adjusted under 35 U.S.C. 154(b) by 0 days.

(21) Appl. No.: 09/449,593

(22) Filed: Nov. 29, 1999

Related U.S. Application Data

(60) Provisional application No. 60/117,549, filed on Jan. 28, 1999.

(51) Int. Cl.[7] ................................................. G02B 5/08
(52) U.S. Cl. ................................................... 359/850
(58) Field of Search ................................. 359/618, 630, 359/850, 855, 856, 857, 860, 633; 349/7, 9; 434/72, 76, 90

(56) References Cited

U.S. PATENT DOCUMENTS

| | | | | |
|---|---|---|---|---|
| 3,947,188 A | * | 3/1976 | Simpson | ....................... 353/76 |
| 4,676,598 A | | 6/1987 | Markley et al. | ............. 350/171 |
| 4,830,445 A | * | 5/1989 | Robinson | .................... 350/3.85 |
| 4,856,997 A | * | 8/1989 | Mellecker | ..................... 434/72 |
| 5,841,509 A | * | 11/1998 | Harooni | ....................... 351/221 |
| 5,886,822 A | * | 6/1999 | Spitzer | ......................... 359/630 |

\* cited by examiner

*Primary Examiner*—Georgia Epps
*Assistant Examiner*—Gary O'Neill
(74) *Attorney, Agent, or Firm*—Van Dyke, Gardner, Linn & Burkhart, LLP

(57) ABSTRACT

A method and apparatus for viewing at a right angle, such as in a generally horizontal direction from a prone or supine position, includes providing at least two reflective surface portions oriented at an acute angle to each other. One of the reflective surface portions is positioned in the user's line of sight and the other of the reflective surface portions is positioned in an optical path extending to an area to be viewed. The user looks into one of the reflective surface portions and views the object along the optical path. The method and apparatus modifies the viewing direction of the user without inverting the viewed image.

48 Claims, 2 Drawing Sheets

VIEWING DIRECTION MODIFYING DEVICE AND METHOD

CROSS REFERENCE TO RELATED APPLICATIONS

This application claims priority from provisional application Ser. No. 60/117,549 filed Jan. 28, 1999, which is hereby incorporated herein by reference.

BACKGROUND OF THE INVENTION

This invention generally relates to viewing devices and, in particular, to viewing devices which allow viewing at right angles without inverting the image. The invention is especially useful for viewing in a horizontal direction from a prone or supine position.

There are certain types of eye surgery which require the patient to maintain a face-down position with a minimum of eye movement for extended periods of time, up to several weeks. While in this position, the person obviously has very limited ability to perform many ordinary functions, such as reading, viewing television, or seeing little more than the feet of those giving assistance or visiting during this recovery period.

While the use of a mirror may seem an obvious solution to this problem, objects would appear upside down and backwards. Reading in this manner obviously would be next to impossible, and attempts at viewing other things would appear quite abnormal.

The device described here allows the patient to see horizontally while looking in a downward or upward direction, and to view the object in a completely normal and upright orientation.

DESCRIPTION OF THE INVENTION

A viewing device according to the invention provides an unobstructed viewing path which is essentially horizontal, while the gaze of the person remains in a vertical direction. More specifically, a first reflective surface directs the view toward a second reflecting surface, which directs the view in a horizontal direction. The image as seen by the person is non-inverted and clearly visible, as if viewing it directly without the device.

According to an aspect of the invention, a method of viewing in a generally horizontal direction from a prone or supine position includes providing at least two surfaces having reflective portions oriented at an acute angle to each other. One of the reflective surface portions is positioned in the user's line of sight. The other of the reflective surface portions is positioned in an optical path extending to an area to be viewed. The user looks into one of the reflective surface portions and views objects along the optical path.

According to another aspect of the invention, a viewing device includes a housing and at least two surfaces having reflective portions supported at the housing. The at least two surface reflective portions are oriented at an acute angle to each other. An object viewed in one of the reflective surface portions is reflected from the other of the reflective surface portions. This provides non-inverted images of objects viewed at an approximate right angle from the direction of viewing.

According to yet another aspect of the invention, a viewing device includes a housing formed in a generally Z-shape defining two support surfaces at an acute angle to each other. A first reflective surface is positioned on one of the support surfaces and a second reflective surface is positioned on the other of the support surfaces.

These and other objects, advantages and features of this invention will become apparent upon review of the following specification in conjunction with the drawings.

DESCRIPTION OF THE PREFERRED EMBODIMENT

Figure 1:
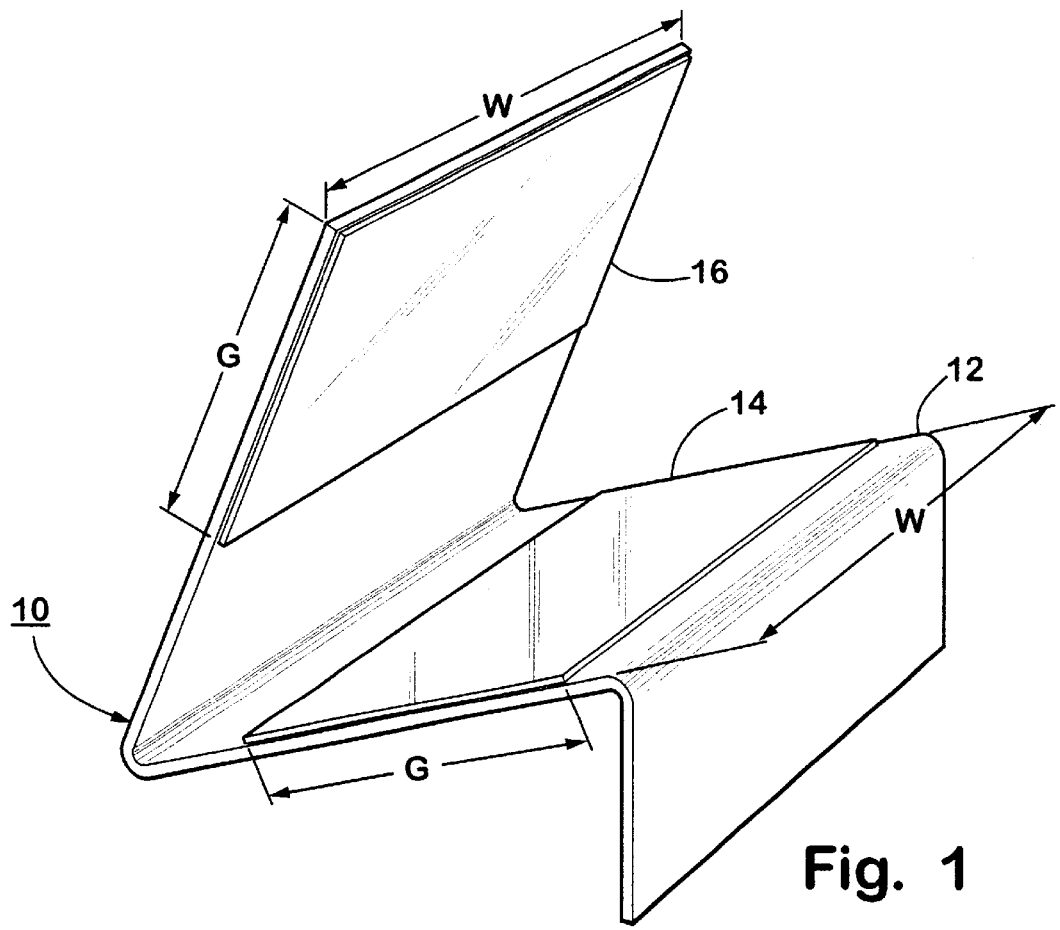
FIG. 1 is a perspective view of a viewing device according to the invention.
Figure 2:
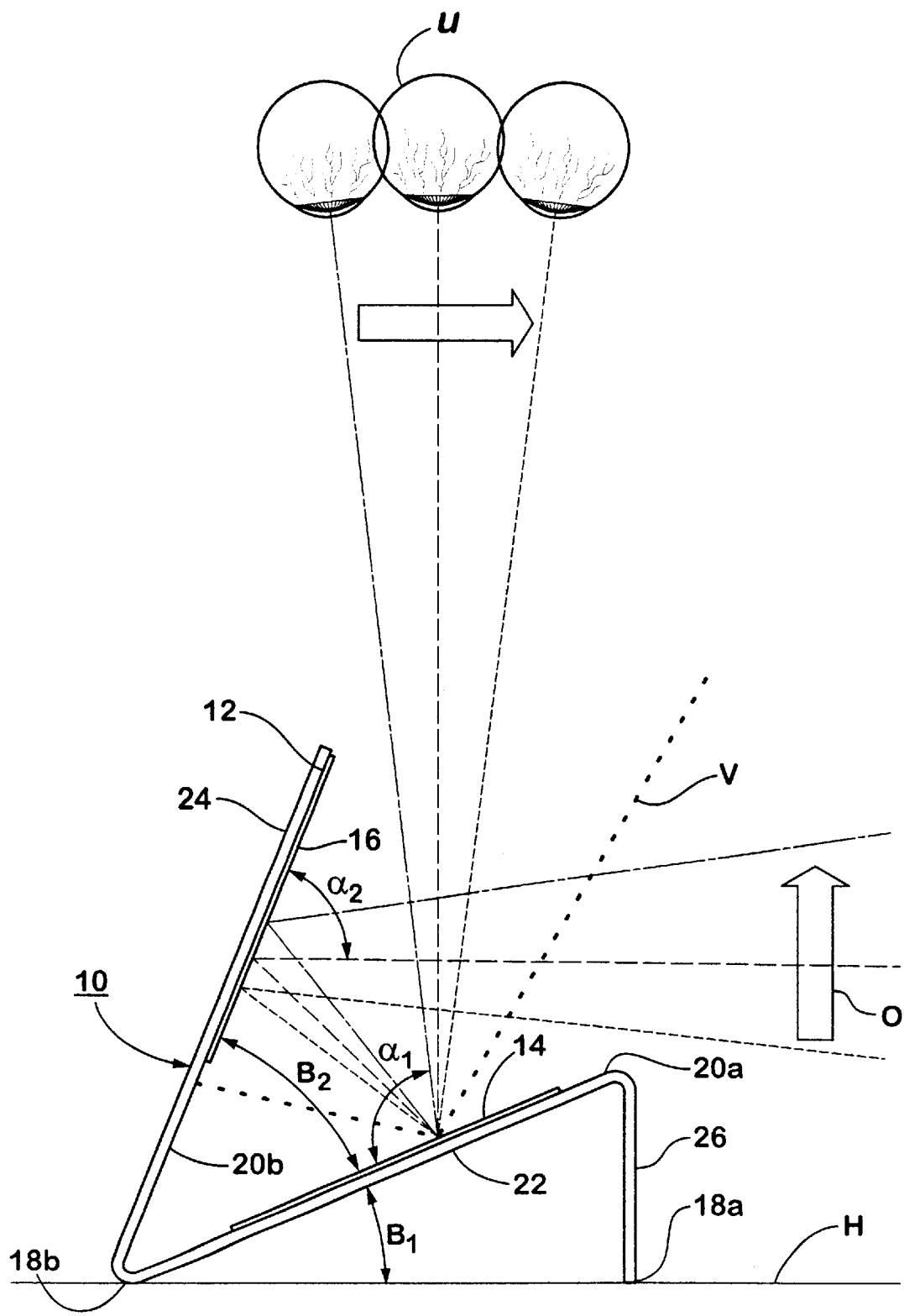
FIG. 2 is a side elevation of the viewing device in FIG. 1 illustrating a method of viewing according to the invention.

A viewing device 10 which modifies the viewing direction without inverting a viewed image, includes a housing 12 having first and second surfaces, or reflective elements, 14, 16 defining respective reflective portions thereof (FIGS. 1 and 2). Housing 12 has a support defined by points 18a and 18b in order to allow housing 12 to be positioned on a horizontal surface illustrated at H. Housing 12 is generally Z-shaped with a first support surface 22 supporting reflective element 14 and a second support surface 24 arranged at an acute angle to support surface 22 in order to support reflective surface 16. The housing further includes a leg 26 which terminates in support 18a. Support 18b is defined at the bight between support surfaces 22 and 24. Reflective surfaces 14 and 16 are oriented with respect to each other at an acute angle $\beta_2$ which is preferably approximately 45 degrees. With housing 12 positioned on horizontal surface H, reflective surface 14 is oriented at an angle $\beta_1$ with respect to horizontal of approximately 22.5 degrees. Reflective surface 14 is positioned at a viewing angle $\alpha_1$ with respect to the view of a user illustrated at U. In the illustrated embodiment, angle $\alpha_1$ at approximately 67.5 degrees. Second reflective surface 16 is positioned at an angle $\alpha_2$ with respect to the viewing path V, which is essentially horizontal. In the illustrated embodiment, angle $\alpha_2$ is approximately 67.5 degrees.

With this arrangement, the user U looks, or gazes, along a line of sight in the direction of reflective surface 14. An image to the right of viewing device 10, as illustrated in FIG. 2, is reflected from reflective surface 16 to reflective surface 14 and upward to the viewer U. As illustrated in FIG. 2, the viewer may change his or her position of viewing reflective surface 14, as illustrated by the multiple positions of the viewer's eyes, and still be able to observe an object O along the viewing path. Advantageously, the object O is viewed by the user in the same orientation as if the user was looking directly at the object, as illustrated by the orientation of the viewed object in FIG. 2. In particular, the object is viewed without being inverted either top to bottom or left to right. This is especially important when viewing device 10 is utilized to read text, or the like.

A non-reflecting surface portion 20a may be provided outward of reflective surface 14. This portion is non-reflective in order to avoid the user viewing himself or herself. Alternatively, support surface 20 could be made shorter in order to align leg 26 with the front edge of reflective surface 14 to avoid the user viewing himself or herself. However, the outward extension of the housing beyond the outer edge of reflective surface 14 provides a form of protection of the outer edge thereof from being harmed by contact with other objects. Another non-reflecting surface portion 20b may be provided below reflective surface 16 in the direction of reflective surface 14. Non-reflecting surface portion 20b avoids a third reflection from a viewing direction V. The third reflection (twice off reflective surface 14) would result in an undesirable inverted viewed image. Non-reflecting surface portion 20b is provided by positioning all portions of reflective surface 16 substantially above the highest vertical extent of reflective surface 14 when housing 12 is generally horizontal.

Preferably, housing 12 is formed by a continuous sheet of plastic, such as smoked Plexiglas, or an acrylic, or other plastic. Preferably, a continuous sheet is heat-deformed into the Z shape illustrated in FIG. 2. However, housing 22 could be formed from individual sheets attached to each other in the orientation illustrated in FIG. 2 and can be made from other materials such as metals, structural plastics, and the like.

In the illustrated embodiment, reflective elements 14, 16 preferably have a lateral width W that is at least as wide at the eye separation of the user. Most preferably, width W is approximately twice the width of the user's eye separation or greater. In the illustrated embodiment, W is seven inches and the opposite direction G is four inches. Other dimensions will suggest themselves to the skilled artisan.

Reflective surfaces 14, 16 are preferably defined by a single-strength mirror of the type known in the art. Most preferably, reflective surfaces 14, 16 are defined by an automotive grade mirror. It has been discovered that automotive grade mirrors provide a lightweight, low distortion reflectance which allows the user to be able to read rather fine print without significant distortion and attenuation thereof. Other possible materials for reflective elements 14, 16 include polished metal surfaces, household mirrors, plastic mirrors, and the like. Reflective surfaces 14, 16 can be defined by first surface-reflecting devices or second surface-reflecting devices or a combination thereof.

Figure 3:
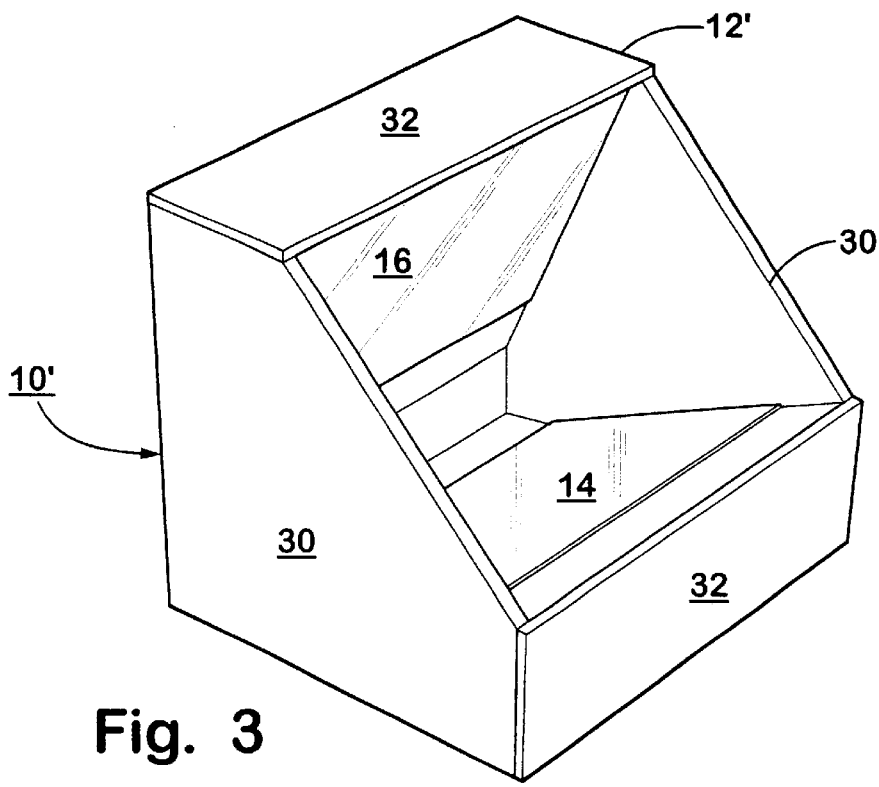
FIG. 3 is the same view as FIG. 1 of an alternative embodiment thereof.

An alternative embodiment of a viewing device 10' illustrated in FIG. 3 includes a housing 12' made up of first and second sidewalls 30, first and second endwalls 32, and bottom and backwalls (not shown). Housing 12' has an advantage of shielding reflectance surface 14 and 16 from lateral light sources, but is not preferred because of the additional expense of fabricating and attaching the various walls forming housing 12'.

The invention may be utilized for a patient restrained to either a prone or supine position. Other uses of viewing device 10 may suggest themselves to those skilled in the art. For example, it may be useful to view inside of machinery and other tight spaces and around blind corners.

The vertical field of view is easily varied from true horizontal to slightly upward or downward from the horizontal by simply moving the device slightly forward or backward with respect to the eye position. Once the device is positioned on a support surface, movement of the user's eyes within a limited range will not change the position of the image viewed. Also, slight tilting of viewing device 10 will not cause a movement of the object being viewed. This is especially useful when the viewing device is held rather than positioned on a support surface or in cases where the support surface may move or vibrate.

The device is a mirrored viewing system designed for use by persons recuperating from Vitrectomy and/or other types of eye surgery, where the patient is required to maintain a face-down position for extended periods of time, even up to several weeks. This unique device allows the person to comfortably see in a "normal" level line of sight while in this face-down position.

The device is rugged, light weight and easily moved and used in a variety of ways; for example, while sitting, standing, or lying down. It is useful to see people, watch TV, or read. It may be placed on a table, on the floor, held in your hands, or on your lap. It is readily adapted to other face support systems in common use. The present invention makes recovery from the surgery much easier to endure.

Objects are seen in an upright position, so reading and viewing TV appear as in normal viewing. Rotating the system allows scanning a broad view (full room), and moving the system slightly back and forth will change the vertical height being observed.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of viewing from a prone or supine position in a direction that is generally at a right angle to the viewer's line of sight, comprising:

providing at least two surfaces having reflective portions oriented at an acute angle to each other, one of said reflective surface portions positioned in the user's line of sight and the other of said reflective surface portions positioned in an optical path extending to an area to be viewed; and looking into said one of said reflective surface portions from a prone or supine position and viewing objects along said optical path.

2. The method of claim 1 wherein said acute angle is approximately 45 degrees.

3. The method of claim 2 wherein one of said reflective surface portions is at a first angle to the user's line of sight and said other of said reflective surface portions is at a second angle of the optical path extending to the area to be viewed.

4. The method of claim 3 wherein said first and second angles are each approximately 67.5 degrees.

5. The method of claim 1 wherein at least one of said reflective surface portions is defined by one of a first surface-reflecting mirror and a second surface-reflecting mirror.

6. The method of claim 1 wherein at least one of said surfaces includes a generally non-reflective surface portion in order to avoid viewing images in the direction of the user.

7. The method of claim 6 wherein the other of said surfaces includes another generally non-reflective surface portion in order to avoid triple reflections of images toward the direction of the user.

8. The method of claim 1 wherein one of said surfaces includes a generally non-reflective surface portion in order to avoid triple reflections of images toward the direction of the user.

9. The method of claim 1 including providing a housing to retain said at least two reflective surface portions oriented at said acute angle to each other and to support said reflective surface portions from a horizontal surface.

10. The method of claim 1 including providing said at least two surfaces having reflective portions of lateral widths that are greater than a separation distance of a user's eyes.

11. The method of claim 1 including providing said at least two surfaces having reflective portions of lateral widths that are approximately twice the separation distance of a user's eyes.

12. The method of claim 1 including providing said at least two surfaces having reflective portions of lateral widths that are approximately 7 inches wide.

13. The method of claim 1 wherein said at least two reflective surface portions comprise single-strength mirrors.

14. A method of viewing in a direction that is generally at a right angle to the viewer's line of sight, comprising:

providing at least two surfaces having reflective portions oriented at an acute angle to each other, one of said reflective surface portions positioned in the user's line of sight and the other of said reflective surface portions positioned in an optical path extending to an area to be viewed; and looking into said one of said reflective surface portions and viewing objects along said optical path;

wherein said at least two reflective surface portions comprise automotive grade mirrors.

15. A viewing device, comprising:

a housing; and at least two surfaces having reflective portions supported at said housing, said at least two reflective surface portions oriented at an acute angle to each other, said at least two reflective surface portions being substantially fixed with respect to each other in a manner that said at least two reflective surface portions are non-adjustable with respect to each other, wherein an object viewed in one of said reflective surface portions is reflected from the other of said reflective surface portions thereby providing non-inverted images of objects viewed at an approximately right angle from the direction of viewing.

16. The viewing device in claim 15 wherein said first acute angle is approximately 45 degrees.

17. The viewing device in claim 15 wherein one of said second acute angles is approximately 22.5 degrees.

18. A viewing device, comprising:

a housing; and at least two surfaces having reflective portions supported at said housing, said at least two reflective surface portions oriented at an acute angle to each other, wherein an object viewed in one of said reflective surface portions is reflected from the other of said reflective surface portions thereby providing non-inverted images of objects viewed at an approximately right angle from the direction of viewing;

wherein said housing is formed from at least one plastic sheet formed in a generally Z shape.

19. The viewing device in claim 18 wherein said housing is formed from a continuous sheet of acrylic plastic.

20. The viewing device in claim 15 wherein said housing has a pair of side walls, at least one end wall and a riser between said side walls.

21. The viewing device in claim 15 including a generally non-reflecting surface portion extending from one of said reflective portions to avoid viewing images in the direction of the user.

22. The viewing device in claim 21 including another generally non-reflecting surface portion extending from the other of said reflective portions to avoid triple reflections of images toward the direction of the user.

23. The viewing device in claim 15 including a generally non-reflecting surface portion extending from one of said reflective portions to avoid triple reflections of images toward the direction of the user.

24. The viewing device in claim 15 wherein each of said reflective portions has a lateral width transverse a viewing direction greater than or equal to 4 inches.

25. The viewing device in claim 24 wherein each of said reflective portions has a lateral width transverse a viewing direction of approximately 7 inches.

26. The viewing device in claim 15 wherein at least one of said reflective portions is defined by one of a first surface-reflecting mirror and a second surface-reflecting mirror.

27. The viewing device in claim 15 wherein at least one of said reflective portions comprises a single-strength mirror.

28. The viewing device in claim 15 wherein at least one of said reflective portions comprises an automotive grade mirror.

29. The viewing device in claim 15 wherein said housing is adapted to rest on a generally horizontal support surface with one of said reflective portions oriented at another acute angle to the generally horizontal support surface supporting said housing.

30. A viewing device comprising:

a housing formed in a generally Z shape defining two support surfaces at an acute angle to each other;

a first reflective surface portion on one of said support surfaces; and a second reflective surface portion on other of said support surfaces, wherein an object can be viewed from a prone or supine position in a direction that is generally at a right angle to the viewers line of sight by looking into one of said first and second reflective surface portions.

31. The viewing device in claim 30 wherein said housing is formed from a continuous sheet of acrylic plastic.

32. The viewing device in claim 30 wherein at least one of said reflective portions comprises a single-strength mirror.

33. A viewing device, comprising:

a housing formed in a generally Z shape defining two support surfaces at an acute angle to each other;

a first reflective surface portion on one of said support surfaces; and a second reflective surface portion on the other of said support surfaces;

wherein at least one of said reflective portions comprises an automotive grade mirror.

34. The viewing device in claim 30 wherein said housing is formed substantially from a continuous sheet.

35. A viewing device, comprising:

a housing; and at least two surfaces having reflective portions supported at said housing, said at least two reflective surface portions oriented such that an object viewed in one of said reflective surface portions is reflected from the other of said reflective surface portions thereby providing non-inverted images of objects viewed at an approximately right angle from the direction of viewing;

said one of said reflective surfaces being oriented with respect to said other of said reflective surface portions and being viewable from a range of viewing angles between a viewer's eyes and said one of said reflective surfaces, wherein vertical fields of view of objects and lateral fields of view of objects are variable by varying said viewing angle between the viewer's eyes and said one of said reflective surfaces.

36. The viewing device in claim 35 wherein said at least two reflective surface portions are oriented approximately 45 degrees with respect to each other.

37. The viewing device in claim 35 wherein said housing is formed from at least one plastic sheet formed in a generally Z shape.

38. The viewing device in claim 37 wherein said housing is formed from a continuous sheet of acrylic plastic.

39. The viewing device in claim 35 wherein said housing has a pair of side walls, at least one end wall and a riser between said side walls.

40. The viewing device in claim 35 including a generally non-reflecting surface portion extending from one of said reflective portions to avoid viewing images in the direction of the user.

41. The viewing device in claim 40 including another generally non-reflecting surface portion extending from the other of said reflective portions to avoid triple reflections of images toward the direction of the user.

42. The viewing device in claim 35 including a generally non-reflecting surface portion extending from one of said reflective portions to avoid triple reflections of images toward the direction of the user.

43. The viewing device in claim 35 wherein each of said reflective portions has a lateral width transverse a viewing direction greater than or equal to 4 inches.

44. The viewing device in claim 43 wherein each of said reflective portions has a lateral width transverse a viewing direction of approximately 7 inches.

45. The viewing device in claim 35 wherein at least one of said reflective portions is defined by one of a first surface-reflecting mirror and a second surface-reflecting mirror.

46. The viewing device in claim 35 wherein at least one of said reflective portions comprises a single-strength mirror.

47. The viewing device in claim 35 wherein at least one of said reflective portions comprises an automotive grade mirror.

48. The viewing device in claim 35 wherein said housing is adapted to rest on a generally horizontal support surface with one of said reflective portions oriented at another acute angle to the generally horizontal support surface supporting said housing.

* * * * *

UNITED STATES PATENT AND TRADEMARK OFFICE
CERTIFICATE OF CORRECTION

PATENT NO. : 6,352,347 B1
DATED : March 5, 2002
INVENTOR(S) : Norman P. Unema

It is certified that error appears in the above-identified patent and that said Letters Patent is hereby corrected as shown below:

Column 3,
Line 40, "surface" should be -- surfaces --.

Column 6,
Line 19, after "device" insert -- , --.
Line 24, after "on" insert -- the --.
Line 27, "viewers" should be -- viewer's --.

Signed and Sealed this

Eighteenth Day of March, 2003

JAMES E. ROGAN
*Director of the United States Patent and Trademark Office*